Oct. 7, 1969 M. J. UNDERHILL 3,471,710

MAGNETIC LOGIC DEVICE AND CORE

Filed Aug. 26, 1966

3 Sheets-Sheet 1

INVENTOR.
MICHAEL J. UNDERHILL

BY

AGENT

INVENTOR.
MICHAEL J. UNDERHILL
BY
Frank R. Trifari
AGENT

INVENTOR.
MICHAEL J. UNDERHILL
BY
Frank R. Trifari
AGENT

United States Patent Office 3,471,710

Patented Oct. 7, 1969

3,471,710

MAGNETIC LOGIC DEVICE AND CORE

Michael James Underhill, Ifield, Crawley, Sussex, England, assignor, by mesne assignments, to U.S. Philips Corporation, New York, N.Y., a corporation of Delaware Filed Aug. 26, 1966, Ser. No. 575,354
Claims priority, application Great Britain, Aug. 26, 1965, 36,657/65
Int. Cl. H03k 19/02
U.S. Cl. 307—88 4 Claims

ABSTRACT OF THE DISCLOSURE

A magnetic logic circuit which uses a magnetic material having a substantially rectangular hysteresis loop with at least four rungs of equal cross-section joined by two side rails and spaced by major apertures of equal size. Each rung is divided by minor apertures into two legs of substantially equal cross section, the cross sectional area of each side rail being equivalent to, or greater than the product of the number of functional rungs and the cross sectional area of one leg. Drive windings through the minor apertures switch the magnetic flux in circular paths around the minor apertures or in linear paths along the rungs.

This invention relates to a magnetic logic device for performing logical functions particularly in response to bipolar pulse and to a core of magnetic material for use in such a device.

Bipolar pulses are pulses having alternate positive and negative phase in a pulse train and unipolar pulses in a pulse train all of the one phase either positive or negative. Magnetic logic devices have been an attractive to logic system designers for some years since if they are able to be constructed of all magnetic active parts they have an attraction for applications where reliability is a prerequisite. Many logic devices for performing logical functions have been proposed using transfluxors and the "laddic" core of Gianola and Crowley as first described in pages 45 to 72 of "The Bell System Technical Journal," January 1959. All these previous systems have used unipolar pulses which have had the drawback that the speed of operation is slow since the core has to be reset after each readout of information.

One particular logic system using a form of laddic core wound as a serial adder in an all magnetic system has been described by N. F. Lockhart in the paper entitled "Logic by ordered flux changes in multipath ferrite cores" published on pages 268–278 of the I.R.E. National Convention Record, June 4, 1958. In this paper the author describes a number of ways in which a magnetic core can be wound to give a plurality of logic functions such as "AND," "OR," "Exclusive OR," "CARRY," "NEITHER NOR" and "IF AND ONLY IF" using the customary binary notation and indicates a possible form of winding to achieve a bipolar composite output from the core.

It is an object of the present invention to provide a magnetic logic device including a novel form of core which enables bipolar pulses to be used to perform a plurality of logic functions in an all magnetic manner.

According to the present invention a magnetic logic device for performing logical functions in response to bipolar pulse signals comprises a core of magnetic material having a substantially rectangular hysteresis loop with at least four rungs of equal cross-section joining two side rails and spaced apart by major apertures of equal size; each of said rungs including a minor aperture having an axis through the core parallel to the axes of the major apertures, said minor apertures dividing each rung into two legs the cross-sectional area of each leg being substantially equal and the cross-sectional area of each side rail being equivalent to, or greater than, the product of the number of useful rungs of the device and the cross-sectional area of one leg, certain of the rungs constituting input rungs and the remainder of the rungs constituting output rungs; drive windings wound on a corresponding leg of each rung the sense of the windings on the output rung being opposite to that on the output rungs, input windings wound on each input rung and drive and prime windings on each output rung.

In order that the invention may be readily understood one embodiment thereof for use as a stage of an intermediate of a serial adder will now be described by way of example with reference to the three figures of the accompanying drawings in which.

Figure 1:
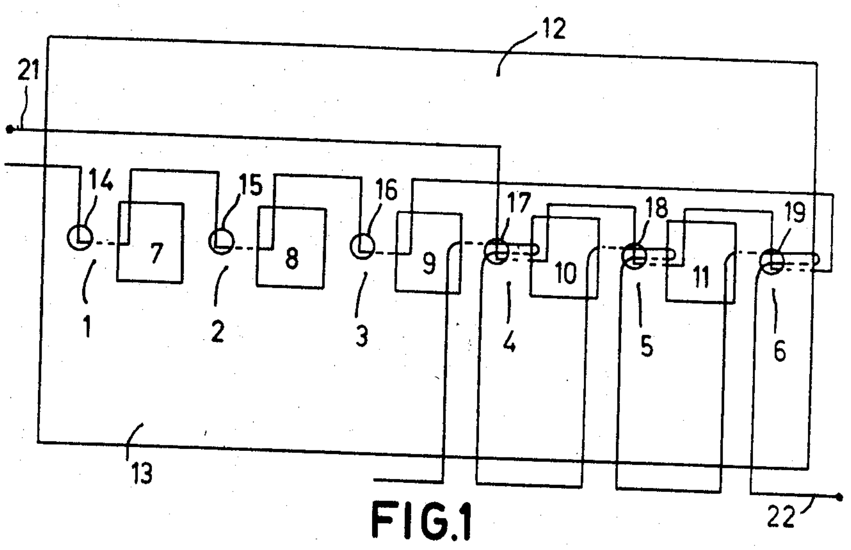
FIGURE 1 shows the shape of core used with the arrangement of drive of prime windings.
Figure 2:
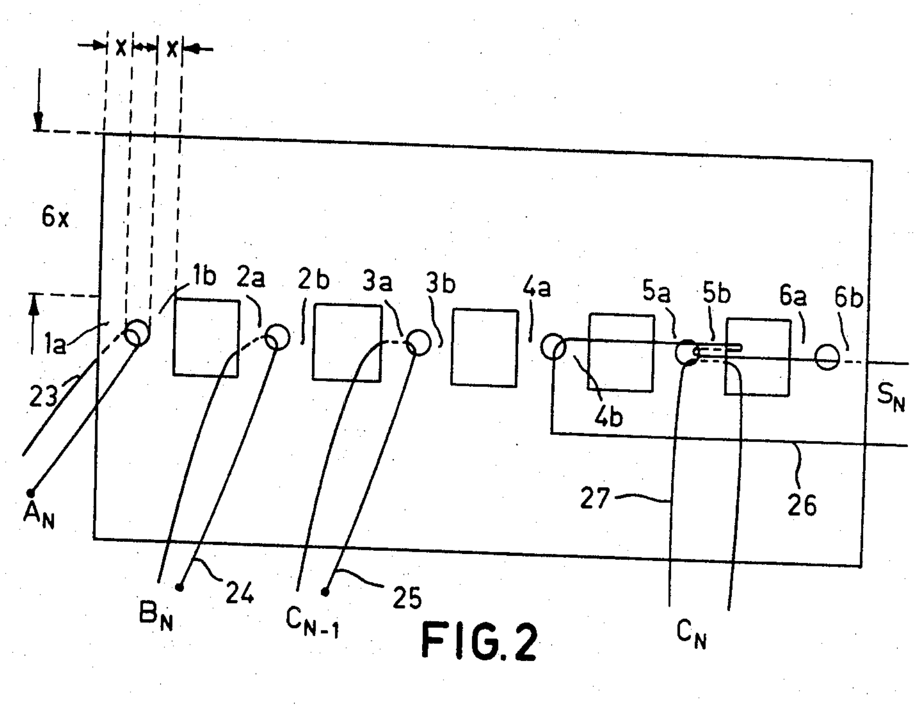
FIGURE 2 shows the core of FIGURE 1 showing the arrangement of the input and output windings and FIGURES 3, 4 and 5 show the core with various flux patterns which are set up in the rungs for different input conditions.

Referring now to FIGURES 1 and 2 of the drawings, the core shown is manufactured from a ferrite material having a substantially rectangular hysteresis loop so that it is able to be driven into magnetic saturation. The core comprises six rungs 1, 2, 3, 4, 5, 6 separated by five major apertures 7, 8,, 9, 10, 11. Each rung has a minor aperture 14, 15, 16, 17, 18, 19 respectively through its centre with axes parallel to the axes through the core of the major apertures. These minor apertures split the rungs into two legs of equal cross-section denoted by the subscripts *a* and *b* and each leg is of equal width *x*. The rungs 1 to 6 join two side rails 12, 13, which also define the major apertures 7 to 11, and these side rails have a width which is at least equal to the product of the number of useful rungs, i.e., 6, and the width of one leg, i.e., *x*. The thickness of the core is assumed to be constant for the whole length of the core. The number of "useful" rungs referred to is the number of rungs used for flux switching for a particular operation, it would, of course, be possible to use say a seven rung core where the last rung did not have any flux switched in it and so was not in use.

The core of the device is provided with a drive winding 21 which is wound in one sense on the input rungs 1, 2, 3 through the minor apertures 14, 15, 16 and the major apertures 7, 8, 9 about the legs 1*b*, 2*b*, 3*b* and in the opposite sense on the output rungs 4, 5, 6 through the minor apertures 17, 18, 19, the major apertures 10 and 11 and the outside of the core about the legs 4*b*, 5*b*, 6*b*. A prime winding 22 is wound on the *a* legs of the output legs 4, 5, 6 and in a figure-of-eight manner around the *b* legs of these rungs. The figure-of-eight manner of winding is chosen to give the best operating range of prime current at or near the maximum speed of operation. Three input windings 23, 24, 25 are provided wound through apertures 14, 15, 16 on the *a* legs of the input rungs 1, 2, 3 respectively (FIGURE 2). The winding 23 is supplied in operation with pulsed input signals of the binary form 1 or 0 indicating a function $A_n$ to be added, the winding 24 receives pulsed signals $B_n$ representative of another function and the winding 25 receives pulsed signals $C_{n-1}$ representative of a further function to be added. In this example the further function $C_{n-1}$ is a carry signal previously computed from the less significant bits of the two binary numbers that are to be added serially by the core. Two output windings comprising a sum winding 26 and a carry winding 27 are wound on the three output rungs 4, 5, 6.

The output winding 26 is wound to give a binary output signal indicative of the sum $S_n$ of the input signals and the output winding 27 will give an output if the sum generates a carry signal $C_n$. Using the binary notation and assuming that the presence of a pulse indicates a "1" and the addition of the inputs can be interpreted by monitoring both output windings the input summation can be deduced form the following table:

| $A_n$ | $B_n$ | $C_{n-1}$ | $S_n$ | $C_n$ |
|---|---|---|---|---|
| 0 | 0 | 0 | 0 | 0 |
| 1 | 0 | 0 | 1 | 0 |
| 0 | 1 | 0 | 1 | 0 |
| 0 | 0 | 1 | 1 | 0 |
| 1 | 1 | 0 | 0 | 1 |
| 1 | 0 | 1 | 0 | 1 |
| 0 | 1 | 1 | 0 | 1 |
| 1 | 1 | 1 | 1 | 1 |

The windings are shown separately on FIGURES 1 and 2 for the sake of clarity, although it will be understood that in practice all the windings will occur on the same core. In operation alternate positive and negative pulses are applied to the drive windings 21, if there are any inputs to be written into the core these occur as pulses of the same phase as the drive on the appropriate input windings during a drive pulse. Between drive pulses a slowly rising prime pulse occurs of the apposite phase to the previous drive pulse and of sufficient M.M.F. only to switch flux around a minor aperture but not around a major aperture. Since the flux switched by the prime pulse occurs slowly no significant output is obtained on the output windings.

Figure 3:
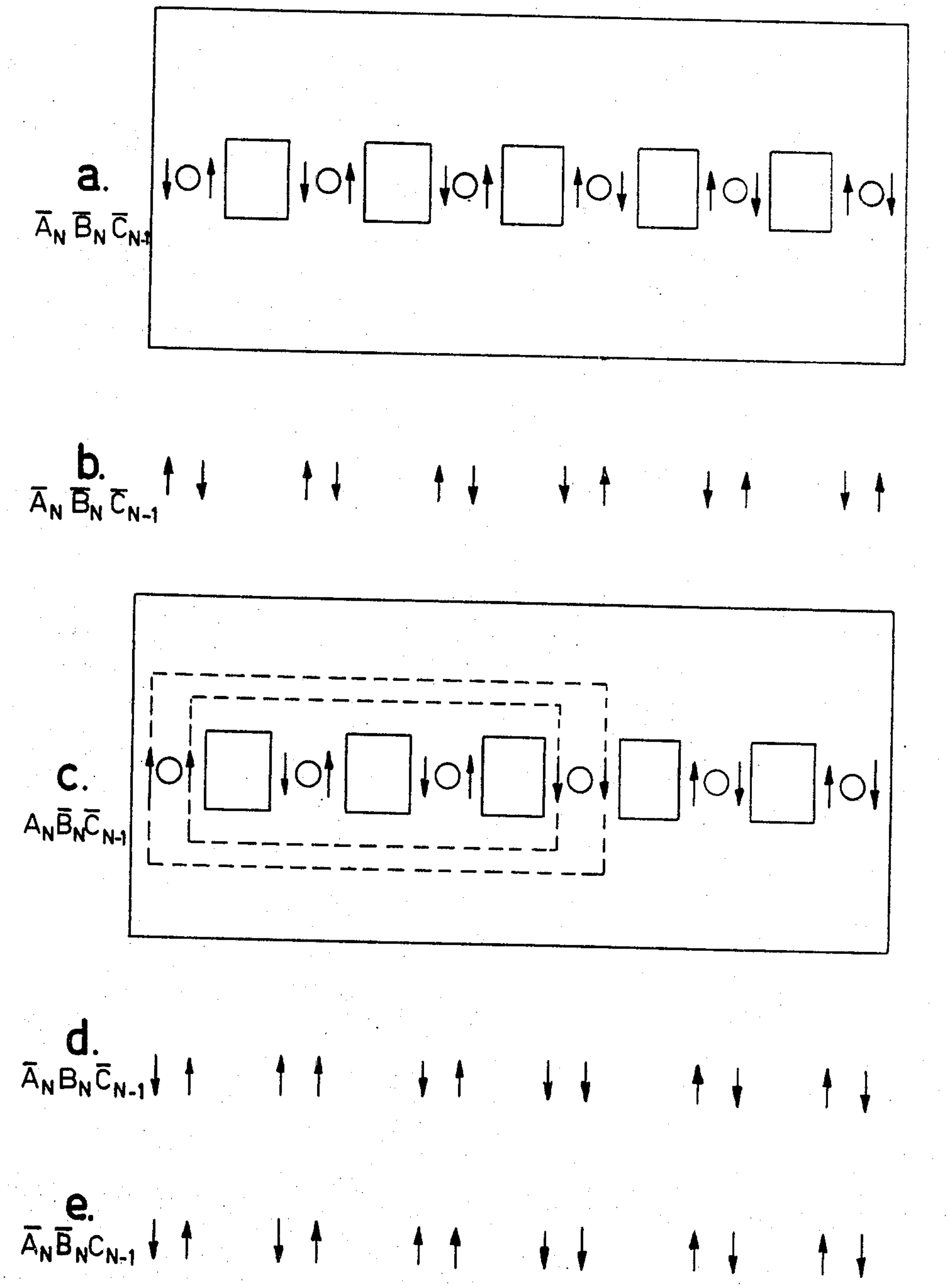

When a positive drive pulse (with no input pulses present) is applied to the drive windings 21 it sets up circulating fluxes around the minor apertures which are in a clockwise direction about the apertures 17, 18, 19 of the output rungs and counter clockwise around the apertures 14, 15, 16 of the input rungs. The flux directions are shown by arrows in the legs of the rungs of FIGURE 3*a*, each arrow indicating magnetic saturation in the direction shown. The flux directions are reversed for a negative drive pulse (with no inputs) as is shown in FIGURE 3*b*. The conditions of the input windings have been shown by normal Boolean symbols on FIGURE 3 by a bar indicating the absence of an input.

FIGURES 3*c*, *d* and *e* show the flux conditions occurring if during a positive drive pulse an input pulse occurs on input windings 23, 24 or 25 respectively. Considering FIGURE 3*c* if the $A_n$ pulse is present this will hold leg 1*a* and set the flux in this leg in the upward direction. Since the flux in leg 1*b* is held in the same direction the rung 1 becomes magnetically blocked and the flux will then switch round the shortest path available. Since rung 2*b* is held by the drive winding 21 and rung 2*a* is already saturated in the downward direction the flux of rung 1 cannot return via this rung. Similarly it cannot return by rung 3 for the same reason. However, the first output rung 4 is held on leg 4*b* by the drive windings 21 and the leg 4*a* is not held and the flux in that leg is the upward direction circulating around minor aperture 17. Since leg 4*a* is not held the direction of the flux can be reversed to complete the flux path between rungs 1 and 4 as is shown in the figure. The flux could have switched down rungs 5 or 6 but since it always takes the shortest path it will switch down rung 4 if only one input is energised. It will be appreciated that the similar reasoning to that applied above can be used to deduce the flux paths if only input signals $B_n$ or $C_{n-1}$ are applied to give the flux conditions in the rungs as shown in FIGURES 3*d* and 3*e*.

At the end of the drive and input pulses if the core is left in the magnetic state shown in FIGURES 3*c*, *d* or *e* only output rung 4 is blocked magnetically. The negative prime pulse or rungs 4, 5 and 6 will now occur and will set the flux in the legs 4*a*, 5*a* and 6*a* in the downward direction. Since the flux in leg 4*a* is already in this direction no flux reversal occurs in this leg and thus no flux direction change occurs in rung 4. However, the flux in legs 5*a* and 6*a* are reversed and a circulating flux set up around minor apertures 18, 19 causing a corresponding flux reversal in legs 5*b* and 6*b*. The prime pulse is followed by a negative drive pulse and (assuming no inputs present) resets the core to the condition shown in FIGURE 3*b*, reversing the circulating flux around minor apertures 15 and 16, reversing the flux in legs 1*b* and 4*b* to set up circulating flux around minor apertures 14 and 17 and having no effect on the flux around minor apertures 18 and 19 since the flux around these apertures was already set in the correct condition by the previous negative prime pulse.

The result of the flux reversal in leg 1*b* is not noticed but since the leg 4*b* is wound by the sum output winding 26 the flux reversal in this leg causes an output pulse on this winding. As no flux reversal occurs in rungs 5 and 6 at this time no other effect is felt on the winding 26 and the sum output $S_n$ is given in the form of a binary 1 signal. The carry winding 27 which embraces leg 5*b* is not affected by the flux reversal in leg 4*b* and therefore gives no output signifying a binary 1. From the table it will be seen that this is the correct output combination for only one input pulse.

Figure 4:
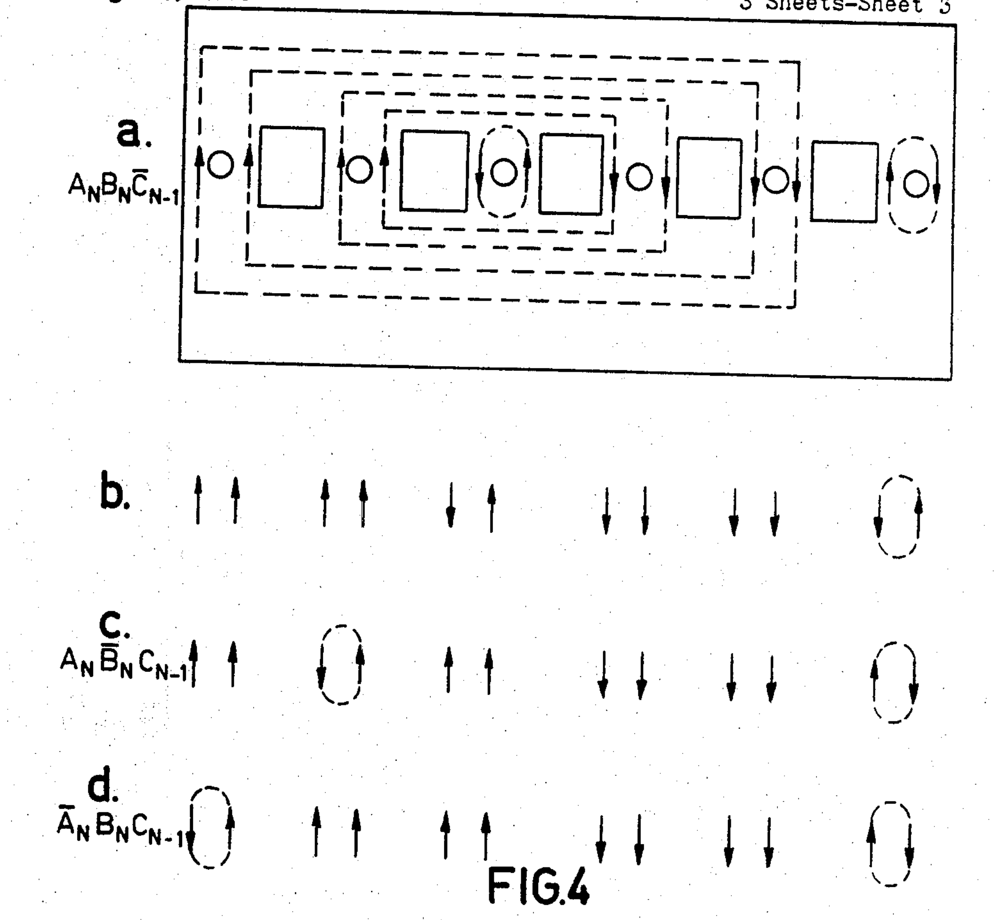

If at the next positive drive pulse it is assumed that two inputs are present, for example, the inputs $A_nB_n$ on windings 23 and 24 and no carry $C_{n-1}$ siginal is present on winding 25 then the flux conditions in the core will be as shown in FIGURE 4*a*. The positive drive pulse will try and set up the flux conditions of FIGURE 3*a* but will only succeed in respect of rung 3 where there is no holding action of the input winding 25 and in respect of rung 6. The $A_n$ signal on winding 23 will hold leg 1*a* and set the flux in this leg in the upward direction while the drivewinding 21 sets the flux in leg 1*b* in the same direction thus causing the rung 1 to become magnetically blocked. In a similar manner the $B_n$ signal on winding 24 sets the flux in leg 2*a* in the upward direction and the drive winding 21 sets the flux in leg 2*b* in the same direction so that the rung 2 is also magnetically blocked. Since it is assumed that magnetic lines of force will not cross each other the flux in rung 2 will be considered first. This cannot switch down rung 1 since this rung is held, it cannot switch down rung 3 since leg 3*b* is held by virtue of the drive winding 21 so the first rung which it can switch down is rung 4 causing a flux reversal in the leg 4*a*. The flux in rung 1 cannot switch down rung 2 since it is magnetically blocked, nor can the flux switch down rung 3 since it is held in leg 3*b* by drive winding 21. Rung 4 is magnetically blocked by the virtue of the switching effect of rung 2 so the next rung 5 is switched down reversing the flux in leg 5*a* which is not held.

The following negative prime tries to establish in rungs 4, 5 and 6 the flux pattern shown for those rungs in FIGURE 3*b*. Since the flux in legs 4*a* and 5*a* is already in the direction required no reversal occurs. The flux in leg 6*a* is, however, in the wrong direction and is reversed around the minor aperture 19 so that at the end of the prime pulse the flux pattern shown in FIGURE 4*b* exists in the core. The following negative drive pulse (assuming again no inputs) sets the core to the flux pattern shown in FIGURE 3*b* causing flux reversal in legs 1*b*, 2*b*, 3*a*, 3*b*, 4*a*, 4*b* and 5*b*. No effect on the output is felt by the flux change in rungs 1, 2 and 3, however, the flux reversal in legs 4*b* and 5*b* which are both wound by the sum output winding 26 causes two units of voltage to be generated in the winding 26. It will be noted that the winding 26 is wound on leg 5*b* in the opposite sense to which it is wound on legs 4*b* and 6*b*. The effect of this is that voltage generated in the winding by virtue of the reversal of flux in leg 5*b* is in the opposite direction to voltage generated by flux reversals in the legs 4*b*, 6*b*. It is assumed that the switching time for each leg is substantially the same. In this example the net effect of the flux reversals in legs 4*b* and 5*b* will be a zero output on winding 26 since the voltage generated therein will be equal and opposite and will cancel. The $S_n$ output will thus be 0. Leg 5*b* is also wound by the carry winding 27 and the reversal of flux on the negative drive in this leg will cause a voltage to be generated to produce in winding 27 an output signal 1 indicative of a carry function $C_n$. From the table it will be seen that the $S_nC_n$ combination 01 subsists for any condition where two inputs are present and the flux patterns with the inputs applied to winding 23, 25 and 24, 25 are shown respectively in FIGURES 4*c* and 4*d*. The action on read out is the same as explained with regard to FIGURES 4*a* and 4*b*, and the outputs are in a suitable form for coupling all-magnetically into subsequent cores.

Figure 5:
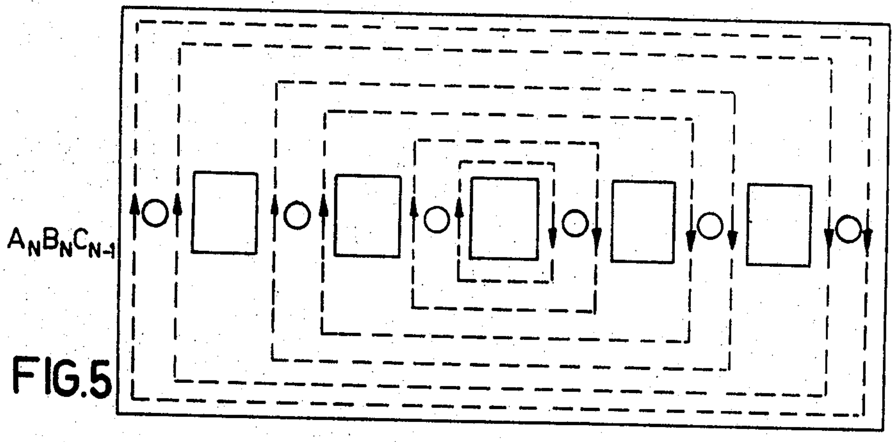

The final combination of possible inputs is shown in FIGURE 5 where on the positive phase all three input windings 23, 24, 25 receive 1 input signals. Rungs 1, 2 and 3 become magnetically blocked and the flux paths will be set up as shown in the figure with the flux in rung 3 switching down rung 4, the flux in rung 2 switching down rung 5 and the flux in rung 1 switching down rung 6. The following negative prime pulses will have no effect since the flux in legs 4*a*, 5*a* and 6*a* is already in the correct direction and on the negative drive pulse in the absence of any coincident negative inputs the flux into legs 4*b*, 5*b* and 6*b* will reverse to set up the pattern of FIGURE 3*b*. The effect of the reversal in these legs is, in respect of the output winding 26, that two units of voltage in one direction are induced by virtue of legs 4*b* and 6*b* and one unit of voltage is induced in the opposite direction by virtue of leg 5*b* giving a net output summation signal $S_n$ of 1 from the winding; and in respect the carry winding 27 a 1 output signal due to the flux reversal in leg 5*b*. This gives the output combination $S_nC_n$=11 indicating the three input AND combination as shown in the table.

Inputs can be written in on the negative drive pulses although for ease of explanation above they were only considered as being written in on the positive phase. In fact usually the positive $C_n$ output is fed back (all-magnetically) to become the negative $C_{n-1}$ input on the subsequent phase, so that the core switches back and forth between the various positive and negative states without being reset each time. This does not affect the logical operation of the core as the outputs derived from the inputs on one phase, although occurring simultaneous with inputs on the next phase, are nevertheless logically independent of them.

It will be apparent that following the teachings of Lockhart the core shown in the drawings can be wound in a number of other ways to enable logic functions to be performed other than those described in the specific example given and enabling bipolar pulses to be used. The core described can be wound for use with unipolar pulses enabling it to be coupled all-magnetically although no advantage relating to speed of operation is then obtained.

What is claimed is:

1. A magnetic logic device for performing logical functions in response to bipolar pulse signals comprising a core of magnetic material having a substantially rectangular hysteresis loop with at least four rungs of equal cross-section joining two side rails and spaced apart by major apertures of equal size; each of said rungs including a minor aperture having an axis through the core parallel to the axes of the major apertures, said minor apertures dividing each rung into two legs the cross-sectional area of each leg being substantially equal and the cross-sectional area of each side rail being equivalent to, or greater than, the product of the number of useful rungs of the device and the cross-sectional area of one leg, certain of the rungs constituting input rungs and the remainder of the rungs constituting output rungs; drive windings wound on a corresponding leg of each rung, the sense of the drive windings on the output rung being opposite to that on the input rungs, input windings wound on each input rung and drive and prime windings on each output rung.

2. A device as claimed in claim 1 in which each of the input windings is wound on that leg of the rung not wound by the drive winding.

3. A device as claimed in claim 2, wherein the output windings are wound on the legs of the output rungs which are also wound by the drive windings.

4. A series as claimed in claim 1, wherein the prime windings are wound on the legs of the output rungs not wound by the drive winding.

References Cited

UNITED STATES PATENTS

| | | | |
|---|---|---|---|
| 3,048,826 | 8/1962 | Averill | 340—174 |
| 3,050,715 | 8/1962 | Stabler | 340—174 |
| 3,116,421 | 12/1963 | Newhall | 307—88 |

STANLEY M. URYNOWICZ, Jr., Primary Examiner